US012578479B2

(12) United States Patent
Yu

(10) Patent No.: US 12,578,479 B2
(45) Date of Patent: Mar. 17, 2026

(54) JAMMING RESISTANT FAST NAVIGATION DATA BITS POLARITY RECOVERY

(71) Applicant: Trimble Inc., Westminster, CO (US)

(72) Inventor: Yiming Yu, Cupertino, CA (US)

(73) Assignee: Trimble Inc., Westminster, CO (US)

( * ) Notice: Subject to any disclaimer, the term of this patent is extended or adjusted under 35 U.S.C. 154(b) by 392 days.

(21) Appl. No.: 18/211,838

(22) Filed: Jun. 20, 2023

(65) Prior Publication Data

US 2024/0427027 A1 Dec. 26, 2024

(51) Int. Cl.
| | |
|---|---|
| *G01S 19/21* | (2010.01) |
| *G01S 19/30* | (2010.01) |
| G01S 19/07 | (2010.01) |
| G01S 19/25 | (2010.01) |

(52) U.S. Cl.
CPC .............. *G01S 19/21* (2013.01); *G01S 19/30* (2013.01); *G01S 19/07* (2013.01); *G01S 19/215* (2013.01); *G01S 19/25* (2013.01)

(58) Field of Classification Search
CPC ........ G01S 19/21; G01S 19/215; G01S 19/30; G01S 19/07; G01S 19/25
USPC ............. 342/357.59, 357.69, 357.44, 357.64
See application file for complete search history.

(56) References Cited

U.S. PATENT DOCUMENTS

| | | | | |
|---|---|---|---|---|
| 7,209,076 B2 | 4/2007 | Roh | | |
| 7,952,519 B1 * | 5/2011 | Nielsen | ................ | G01S 19/215 |
| | | | | 342/357.59 |

| | | | | |
|---|---|---|---|---|
| 10,509,130 B2 * | 12/2019 | Snyder | .................... | G01S 19/21 |
| 11,555,931 B2 * | 1/2023 | Söderholm | ........... | G01S 19/215 |
| 11,662,474 B2 * | 5/2023 | Gick | ...................... | G01S 19/215 |
| | | | | 342/357.59 |
| 2012/0086597 A1 * | 4/2012 | Sin | .......................... | G01S 19/21 |
| | | | | 342/357.23 |
| 2019/0377094 A1 * | 12/2019 | Lentz | ....................... | G01S 19/21 |
| 2021/0109228 A1 * | 4/2021 | Rautalin | ................. | G01S 19/27 |
| 2024/0230921 A1 * | 7/2024 | Keyzer | ................... | G01S 19/23 |

FOREIGN PATENT DOCUMENTS

| | | | | | |
|---|---|---|---|---|---|
| CA | 2803419 A1 * | 1/2012 | .......... | G01S 19/215 |
| EP | 1 391 049 B1 | 5/2008 | | |
| WO | WO-2020121033 A1 * | 6/2020 | ............. | G01S 19/42 |
| WO | WO-2021091414 A1 * | 5/2021 | ........... | G01S 19/215 |

OTHER PUBLICATIONS

Extended European Search Report for Application No. 24182554.6-1206, mailed Nov. 22, 2024, 7 pages.

* cited by examiner

*Primary Examiner* — Chuong P Nguyen
(74) *Attorney, Agent, or Firm* — Kilpatrick Townsend & Stockton LLP

(57) ABSTRACT

A method for reducing the risk of jamming during determination of the polarity of navigation bits in a GNSS signal. More than a threshold number of 1s or 0s are considered to be jamming data, and are ignored in two areas. First, they are ignored in generating a lookup table when determining which bits are historically risky bits in navigation acquisition. Second, they are ignored during a current navigation acquisition, since such bits may be due to current jamming efforts.

20 Claims, 8 Drawing Sheets

602 — Data bits from multiple GPS receivers

604 — Ignore all 0s or all 1s if > threshold

606 — Compare sliding window to detect risky bits.

608 — Generate lookup table

610 — Download LUT to GNSS receivers

JAMMING RESISTANT FAST NAVIGATION DATA BITS POLARITY RECOVERY

BACKGROUND OF THE INVENTION

Global navigation satellite systems (GNSS) use wireless signals that are transmitted from medium Earth orbit (MEO) or geostationary Earth orbit (GEO) satellites to GNSS receivers to determine position, velocity, and time information for the GNSS receivers. Examples of currently operational GNSSs include the United States' Global Positioning System (GPS), the Russian Global Navigation Satellite System (GLONASS), the Chinese BeiDou Satellite Navigation System, the European Union's (EU) Galileo, and the Satellite-based Augmentation System (SBAS). Today, GNSS receivers are used in a wide range of applications, including navigation (e.g., for automobiles, planes, boats, persons, animals, freight, military precision-guided munitions, etc.), surveying, mapping, and time referencing. Further applications for GNSS technology will become available as new techniques for improving GNSS accuracy are introduced.

Unless otherwise indicated herein, the materials described in this section of the Specification are not prior art to the claims in this application and are not admitted to be prior art by inclusion in this section.

BRIEF SUMMARY OF THE INVENTION

A method and apparatus are provided for reducing the risk of jamming during determination of the polarity of navigation data bits in a GNSS signal as received by a GNSS receiver (without waiting for preamble bits). Historic navigation data bits are received at a server from a plurality of GNSS receivers. Historic navigation data bits that have more than a threshold number of consecutive zeros or ones are eliminated. Risky bits are determined by comparing bits of a subframe to corresponding bits of a different subframe and labeling bits that do not match as risky bits. A lookup table of risky bits is prepared and downloaded to a memory in a GNSS receiver. The GNSS receiver receives current GNSS navigation data bits from a satellite and stores them in a memory. Certain current GNSS navigation data bits are flagged as risky using the lookup table of risky bits. New GNSS navigation data bits are predicted from the current GNSS navigation data bits stored in the memory. New GNSS navigation data bits are eliminated when there are more than a threshold number of consecutive zeros or ones. New GNSS navigation data bits are compared to predicted new GNSS navigation data bits and polarity is determined based on a match of new GNSS navigation data bits to predicted new GNSS navigation data bits with no flagged risky bits.

In embodiments, the threshold number of consecutive zeros or ones is between 21-65 bits or between 21-35 bits. In one embodiment, the lookup table of risky bits includes two lookup tables, a GPS lookup table for GPS satellites and receivers and a Beidou lookup table for Beidou satellites and receivers.

In embodiments, the lookup table of risky bits is loaded into a firmware memory in the GNSS receiver during manufacture of the GNSS receiver. In another embodiment, the lookup table of risky bits is downloaded over the internet into the memory in the GNSS receiver.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

The GPS LICA signal and Beidou BII signal use the BPSK (bi-phase shift keying) modulation technique to transmit navigation data bits. Thus, the data bits could be inverted when received by a GNSS receiver. The navigation data are encoded with a fixed data bits pattern called the preamble to help a receiver to determine if data bits received are inverted or not. The polarity of the data bits has to be determined before the navigation data can be correctly decoded and carrier phase measurements can be used for the RTK (Real-Time Kinematic) positioning. Jamming may prevent a correct determination.

Figure 5:
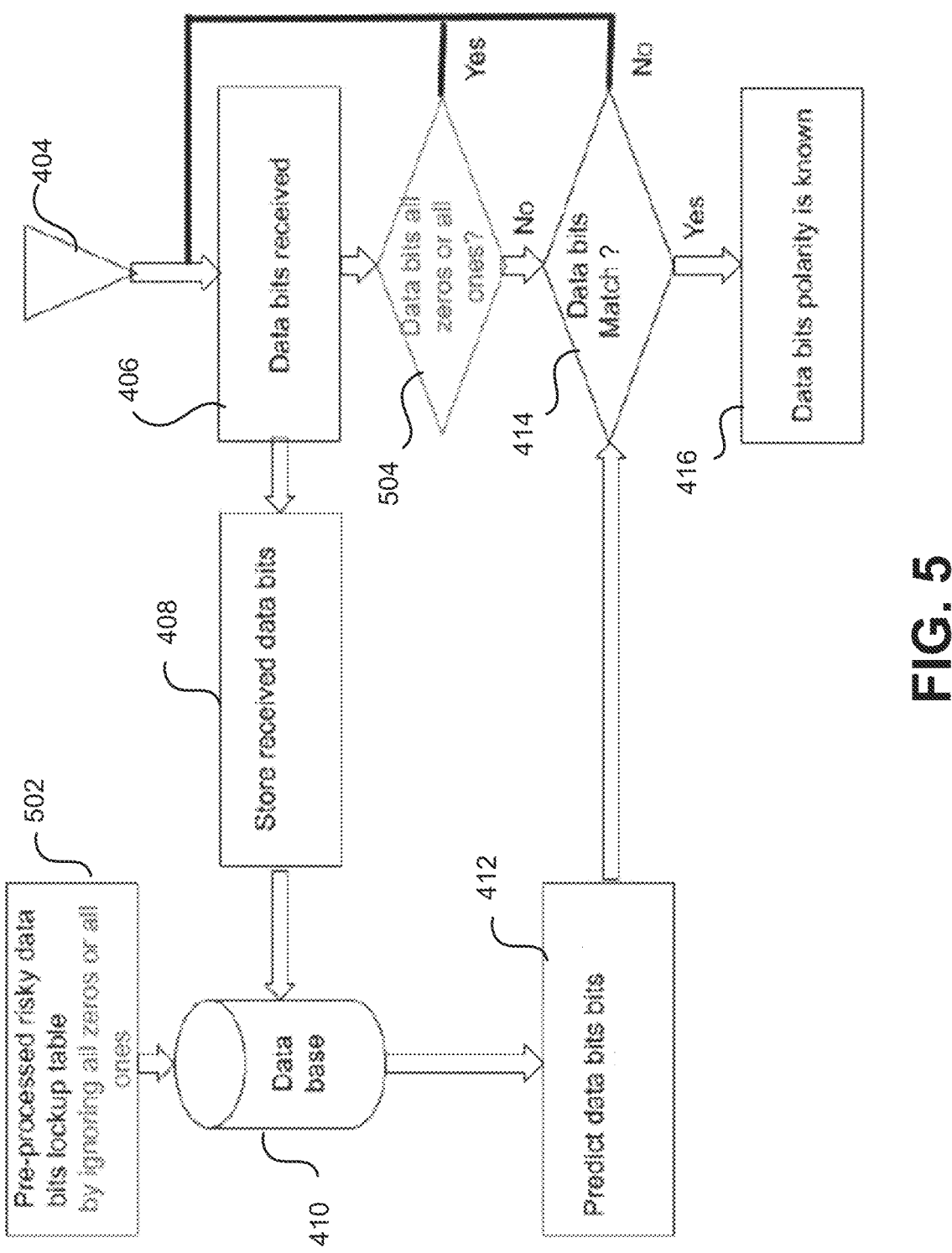
FIG. 5 is a flowchart of a polarity determination process modified to detect jamming, according to embodiments.

In embodiments, more than a threshold number of 1s or 0s are considered to be potentially jamming data, and are eliminated from consideration in two areas, as shown in FIG. 5. First, they are eliminated in generating lookup table 502 when determining which bits are historically risky bits in navigation bits polarity determination. Second, they are eliminated during a current preamble acquisition in step 504, since such bits may be due to current jamming efforts.

Navigation Sensors on Vehicles

Figure 1:
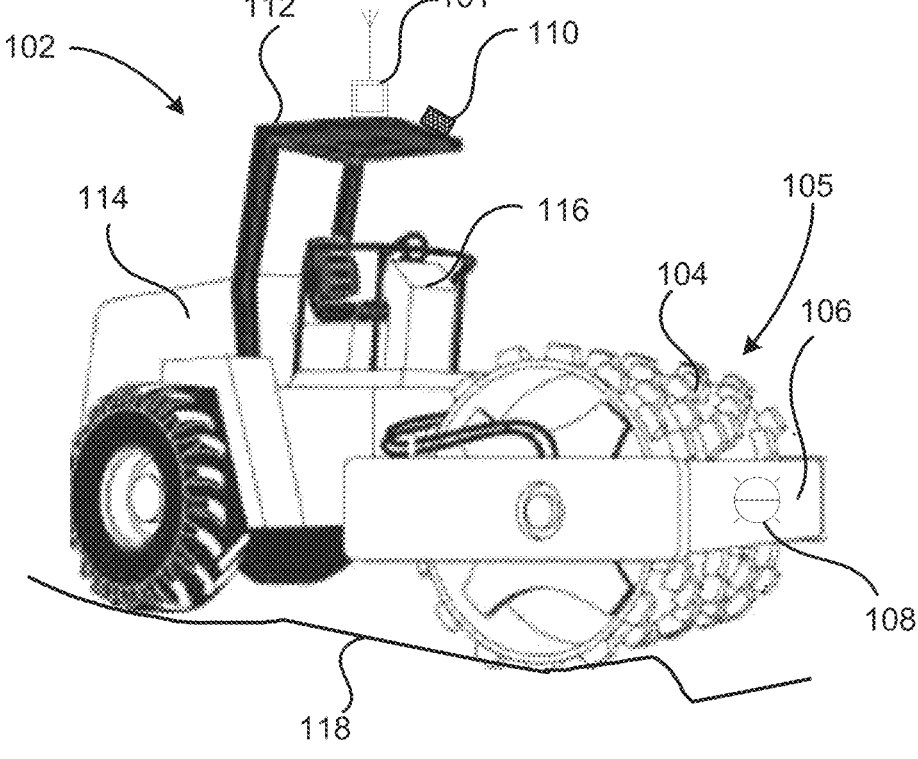
FIG. 1 illustrates the placement of navigation and radar sensors on a vehicle with a soil compactor, according to embodiments.

FIG. 1 shows an example vehicle 102 with soil compactor 105, having a GNSS navigation sensor 101. The soil compactor 105 includes a roller 104 attached to a frame 106 moving over terrain 118. A radar sensor 108 is attached to the front of the frame 106. An optional LiDAR sensor 110 may be attached to a roof 112 of vehicle 102. Frame 106 and compactor 104 can move laterally with respect to cab 114. A console 116 includes a computer and other sensors, including an odometer and a potentiometer at the connection with frame 106 to detect its lateral movement. Other examples of vehicles with articulated segments can include a sprayer with boom arms, a harvester with a header, vehicles with a front or rear hitch, and the like. Embodiments of the invention are applicable to all of such vehicles, as well as other vehicles without articulated segments, such as cars, trucks, boats, aircraft, drones, etc. Embodiments of the invention are also applicable to other uses of GNSS navigation sensors, such as in surveying equipment, smartphones and other electronic devices.

Spoofing of a global navigation satellite system (GNSS) typically refers to the situation in which an attacker transmits a signal that has the same modulation characteristics as the live sky GNSS signal. If the attacker is successful, the receiver is "captured" by the spoofed signal and tracks that signal instead of the signal from the satellite. By delaying or advancing the spoofed signal relative to the live sky signal the attacker can then adjust the measurements the receiver generates and hence move the computed position and/or time of the receiver. A second type of spoofing captures the receiver as just described, but then transmits a different ephemeris message (the data the satellite transmits to describe its location), thereby causing the receiver to change position. A hybrid spoofer can employ both techniques.

Spoofing or jamming can have a variety of ramifications including but not limited to: safety of life (e.g., planes, ships, autonomous vehicles reporting the incorrect position), financial (e.g., financial transactions are timed with GNSS, tolling applications may use GNSS), and loss of productivity (e.g., machinery equipped with GNSS receivers may cause rework, equipment downtime, damaged crops, etc.). A well-positioned jammer could easily affect a whole metropolitan area. For example a relatively low power jammer on Sutro Tower in San Francisco could deny the whole of San Francisco access to GNSS. Well-designed receivers typically reject satellite signals appearing too far away from their current location. For GPS, this means that only receivers within a radius of approximately 300 meters of the target will be affected, although a combination of jamming and spoofing can extend this range as the acquisition process can be vulnerable to spoofing.

Embodiments of the present disclosure include systems, methods, and other techniques for identifying and eliminating a jamming or spoofing signal. Specifically, embodiments eliminate a series of ones or zeros that may be a jamming or spoofing signal during the determination of the polarity of the GNSS signal.

Figure 2:
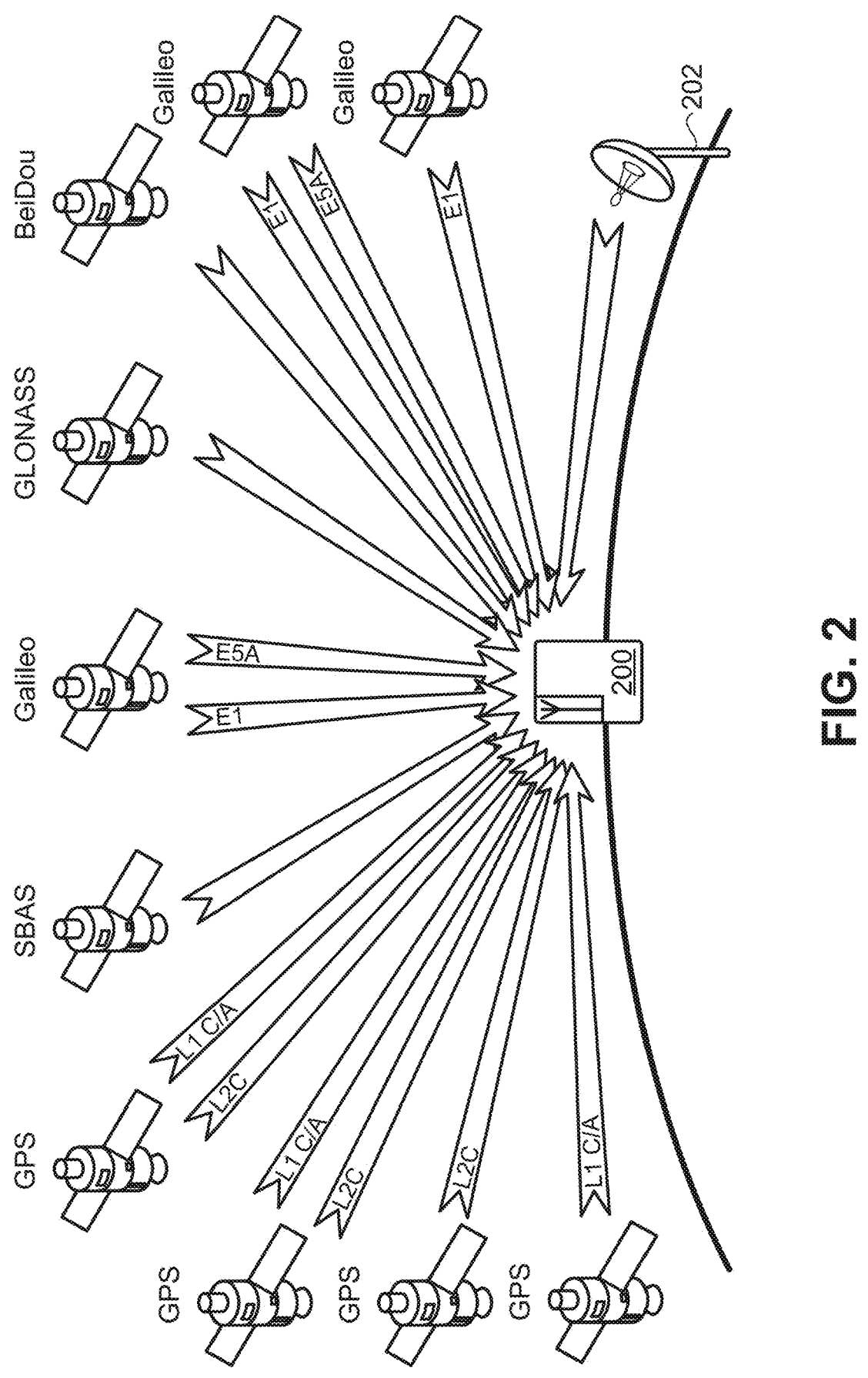
FIG. 2 illustrates a GNSS system, according to an embodiment of the present disclosure.

FIG. 2 illustrates a GNSS system, according to an embodiment of the present disclosure. The GNSS system includes a plurality of GNSS satellites in orbit above a GNSS receiver 200. The GNSS satellites may continuously, periodically, or intermittently broadcast wireless signals modulated onto carrier frequencies (e.g., L1 and/or L2 carrier frequencies). Transmitted wireless signals 104 may be received by an antenna positioned within, on, or near GNSS receiver 200, which may be a patch antenna, a turnstile antenna, a helical antenna, a parabolic antenna, a phased-array antenna, a resistive plane antenna, a choke ring antenna, a radome antenna, among other possibilities.

Each of the GNSS satellites may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo E5A, etc.). For example, a GPS satellite and may transmit wireless signals having a GPS L1 C/A signal type (i.e., wireless signals having frequencies within the GPS L1 band and having been modulated using C/A code). A GNSS satellite may additionally or alternatively transmit wireless signals having a GPS L2C signal type (i.e., wireless signals having frequencies within the GPS L2 band and having been modulated using L2 civil codes). In some embodiments, the GNSS satellite may additionally be a Galileo satellite and may transmit wireless signals having a Galileo signal type (e.g., Galileo E1). Accordingly, a single satellite may include the ability to transmit wireless signals of a variety of signal types.

Merely by way of example, GNSS receiver 100 may use three or more distance estimates between itself and three or more GNSS satellites to generate a position estimate through a process called trilateration. In some instances, trilateration involves generating at least three spheres having center locations corresponding to the locations of GNSS satellites and radii corresponding to the distance estimates (i.e., pseudo ranges). The three spheres intersect at two locations, one of which is more plausible than the other given the position of the earth. The less plausible location is disregarded and the more plausible location is used as the position estimate for GNSS receiver 100. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques.

In some embodiments, a jamming antenna 202 may broadcast a jamming signal that is received by GNSS receiver 100. The jamming signal may be structured as a series of ones or zeros.

The GPS LICA signal uses BPSK (bi-phase shift keying) modulation technique to transmit navigation data bits. Thus the data bits could be inverted when received by a GNSS receiver. The navigation data are encoded with a fixed data bit pattern called the preamble to help a receiver to determine if data bits received are inverted or not. The polarity of the data bits has to be determined before the navigation data can be correctly decoded and carrier phase measurements can be used for Real-Time Kinematic (RTK) positioning. The preamble is encoded in each subframe and is 0.6 seconds long. Each subframe repeats every 6 seconds. On average it takes 3-4 seconds to determine the polarity of the data bits. Using a method of an embodiment of the present invention, based on predicting incoming navigation data bits, the time it takes to determine the polarity of the data bits could be reduced to 1-2 seconds.

Description of the GPS Polarity Determination Method.

GPS satellites receive navigation data from ground antennas, which is sent back to the users through the navigation message. The navigation message provides the information to allow the user to perform the positioning determination. It includes the ephemeris parameters, used to compute the satellite coordinates with enough accuracy, the time parameters and clock corrections, to compute satellite clock offsets and time conversions, the service parameters with satellite health information (used to identify the navigation data set), Ionospheric parameters model used by single frequency receivers, and the almanacs, allowing the computation of the position of all satellites in the constellation. The ephemeris and clocks parameters are usually updated every two hours, while the almanac is updated at least every six days.

Figure 3:
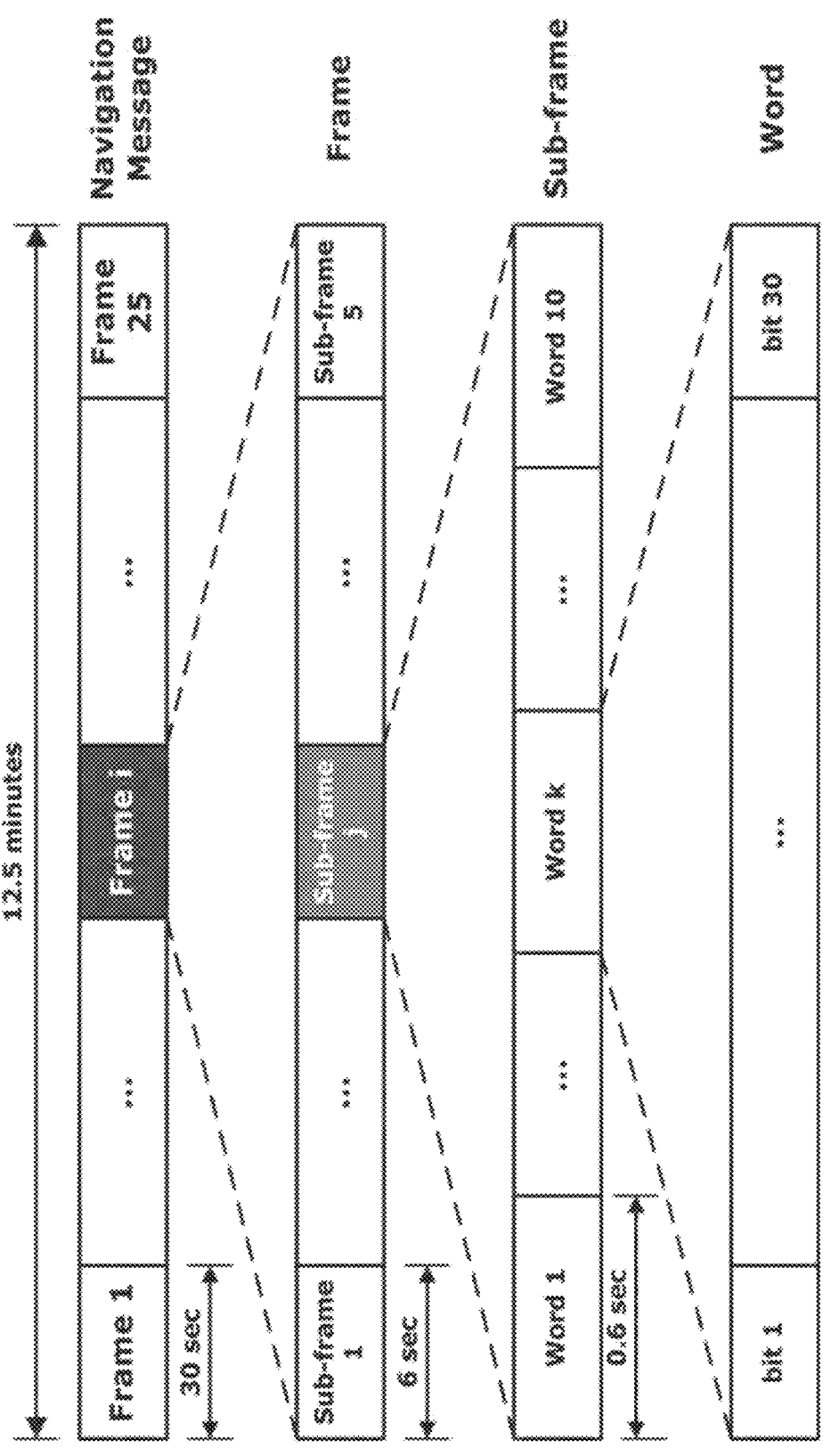
FIG. 3 is a diagram of a GPS navigation message.

FIG. 3 is a diagram of a GPS navigation message. The navigation message consists of 30-second frames 1,500 bits long, divided into five 6-second subframes of ten 30-bit words each. Each subframe has the GPS time in 6-second increments. Subframe 1 contains the GPS date (week number) and satellite clock correction information, satellite status and health. Subframes 2 and 3 together contain the transmitting satellite's ephemeris data. Subframes 4 and 5 contain page 1 through 25 of the 25-page almanac. The almanac is 15,000 bits long and takes 12.5 minutes to transmit.

Figure 4:
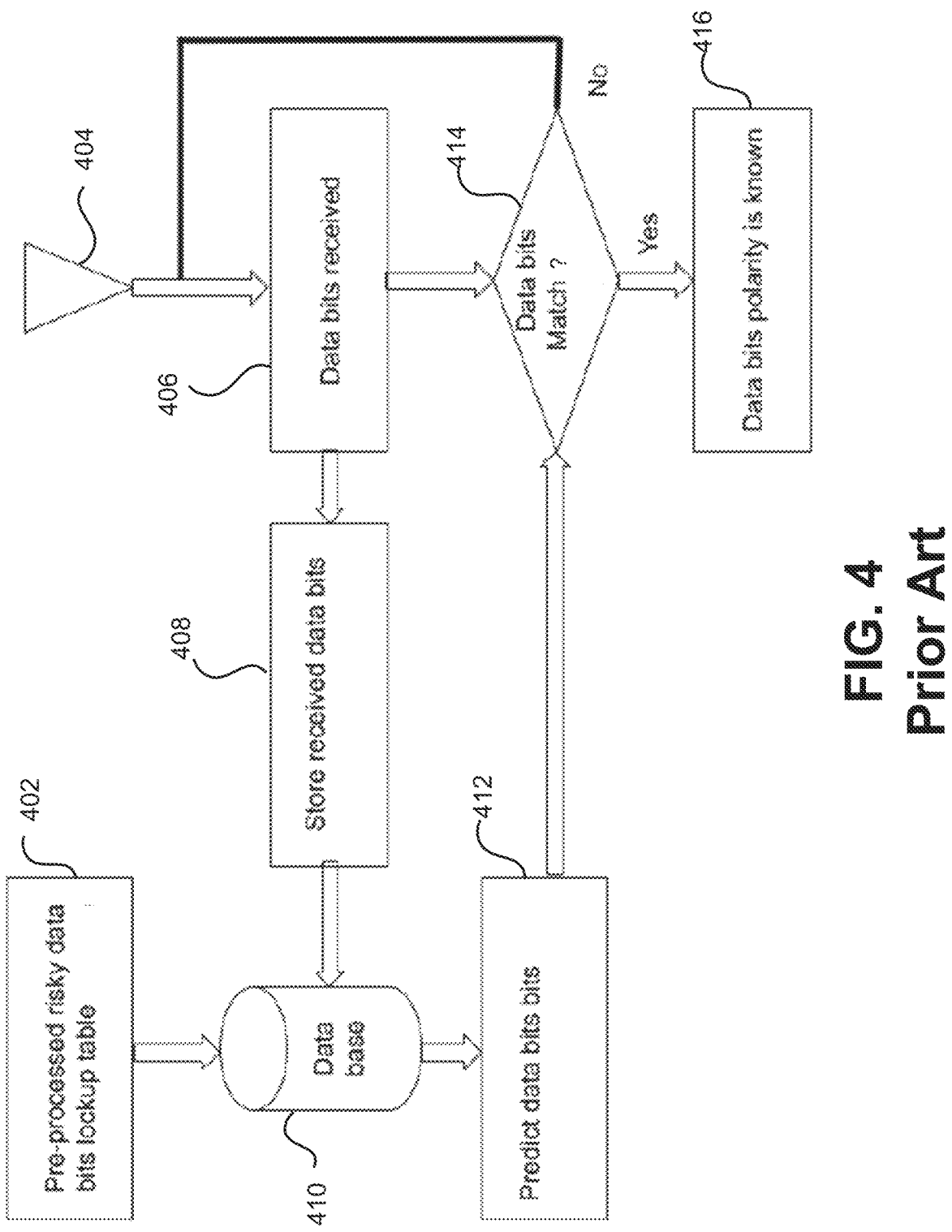
FIG. 4 is a flowchart of a prior art fast GPS polarity determination process.

FIG. 4 is a flowchart of a prior art GPS polarity determination process. Historical risky data is preprocessed to generate a risky data bits look up table 402. The preprocessing involves analyzing historical navigation data bits (e.g. 6 months) to determine each bit's risk factor. It looks at 21 consecutive data bits and compares them with the data bits of the same positions from previous subframes (e.g., 30 seconds earlier). If all 21 data bits are inverted, the middle bit (11th position) is marked as a risky bit. The 21 bit window is shifted one bit at a time. Each bit is either marked as risky or not.

When a GNSS receiver is powered on, a tracking loop manager collects GPS navigation data bits (step 404) and sends the data bits to a navigation data manager (step 406). The navigation manager decodes the data bits subframe by subframe and stores each subframe (step 408) into a database (410) along with their risk factor from lookup table 402.

The navigation manager uses the database to predict future data bits (step 412) for the current subframe and the next subframe. The navigation manager sends the predicted subframe data bits to the tracking loop manager. Each predicted data bit has a flag to indicate if the bit is a risky bit or not.

The tracking loop manager collects incoming data bits and compares them (step 414) with the predicted data bits for X number of bits. The comparison is done by doing an exclusive OR of the 2 streams of data bits. A complete match is declared if the result is either all ones or all zeros and there is no risky bit. When a complete match happens, the polarity of the data bits can then be determined (step 416) to be positive or negative depending on the result being all zeros or all ones.

The above-described method of FIG. 4 was implemented for the GPS system. A similar method has been adapted for the Beidou system. The Beidou navigation data bits have a similar structure but the content and the format of each subframe are different compared to the GPS navigation data bits. The overall processing logic and the polarity detection logic are the same.

Description of Embodiments of a Modified Process to Detect Jamming.

FIG. 5 is a flowchart of a polarity determination process modified to detect jamming, according to embodiments. The preprocessing step of FIG. 4 is changed. As in the previous method, historical risky data is preprocessed to generate a risky data bits look up table. The preprocessing involves analyzing historical data bits (e.g. 6 months) to determine each bit's risk factor. It looks at 21 consecutive data bits and compares them with the data bits of the same positions from previous subframes (e.g., 30 seconds earlier). If all 21 data bits are inverted, the middle bit (11th position) is marked as a risky bit. The 21 bit window is shifted one bit at a time. Each bit is either marked as risky or not.

In addition, the bits are examined to detect whether a chunk of data bits are all zeros or all ones. If more than a threshold number of bits are all zeros or all ones, that indicates potential jamming, and those data bits are excluded to improve reliability. In embodiments, the threshold is 21-35 bits or more. In one embodiment, the threshold is 25, 30 or 35 bits. In one embodiment, the threshold is between 21-65 bits. Thus, a lookup table 502 is generated that has eliminated chunks of data bits that are all zeros or all ones from the risky bit calculation.

As in FIG. 4, current navigation data bits are received (406) and stored (408) in a database 410.

During current operation, the new received navigation data bits are also compared to a threshold in step 504. This is done before the determination of whether the data bits match in step 414. The same threshold of 21-65 bits is used. In one embodiment, the threshold is 25, 30 or 35 bits. In other embodiments, a different threshold may be used for historical data as compared to current data. If the threshold for the historical data is smaller than the threshold for current data, the lookup table is made to be more conservative. Additionally, the current threshold may be varied dynamically if the system receives evidence of possible jamming from another source.

Figure 6:
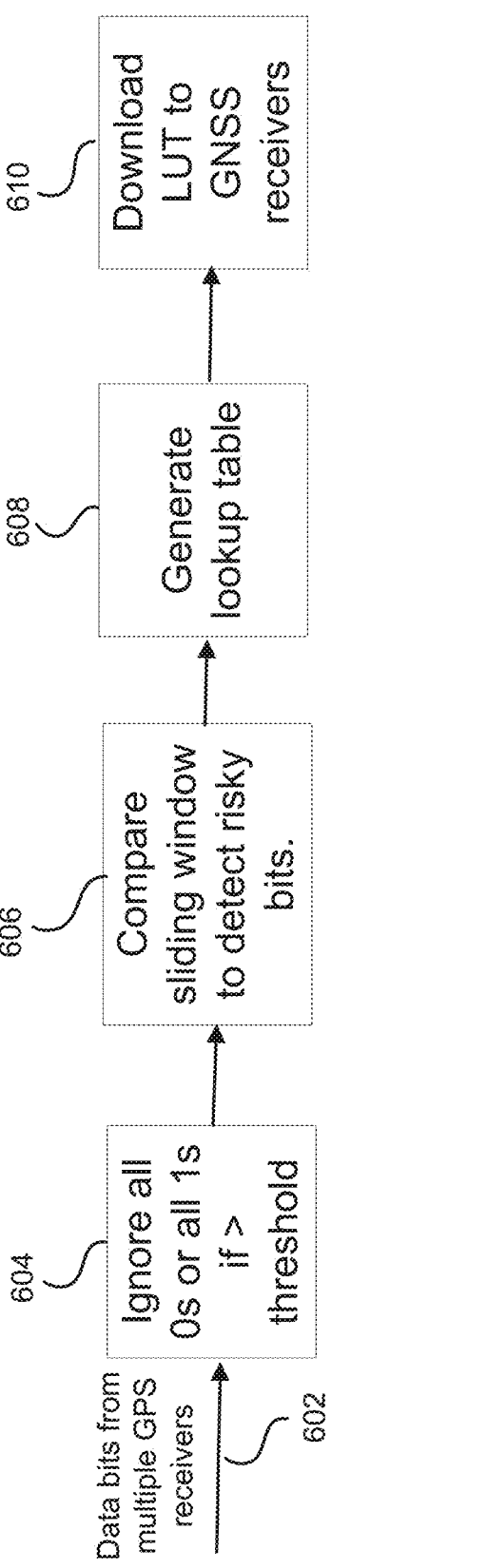
FIG. 6 is a diagram illustrating the historical preprocessing to produce the lookup table of FIG. 5, according to embodiments.

FIG. 6 is a diagram illustrating the historical preprocessing to produce lookup table 502 of FIG. 5, according to embodiments. The preprocessing involves analyzing historical data bits (e.g. 6 months) to determine each bit's risk factor. Data bits are received from multiple GNSS receivers (602) over a 6 month period. In step 604, data bits are ignored if there are more than a threshold of all 0s or all 1s. As described above, a threshold of 21-65 bits is used. In one embodiment, the threshold is 25, 30 or 35 bits. In step 606, a sliding window of a group of bits is compared to the same group of bits from the same position in another subframe approximately 30 seconds later. In one embodiment, the group of bits is 21 bits, although other numbers could be used. The comparison can be done with an exclusive OR function. If all 21 data bits are inverted, the middle bit (11th position) is marked as a risky bit. The 21-bit window is shifted one bit at a time. Each bit is either marked as risky or not.

In one embodiment, a processor does a first pass through the data to determine if there are more than the threshold number of zeros or ones. If there are, the starting and ending locations of the group of zeros or ones is noted and flagged in memory. On a second pass, the processor performs the sliding window comparison described above. Upon reaching the flagged starting location of a group of zeros or ones, the sliding window comparison is halted and advanced to the bit after the ending location. The sliding window comparison then restarts.

Other particular methods could be used to ignore the consecutive ones or zeros above the threshold. For example, the consecutive ones or zeros could be deleted from the data on the first pass. The corresponding bits in the historical data used for the sliding window comparison could also be deleted. The sliding window comparison is then run continuously through the remaining data.

Comparing subframes is done in 2 ways. For subframe 1, 2 and 3, it repeats itself every 30 seconds. Subframe 1 at time T is compared with subframe 1 at time T+30 s and so on. For subframe 4 and 5, it repeats itself every 750 (30*25 pages) seconds. Subframe 4 (page 1) at time T is compared with subframe 4 (page 1) at time T+750 s and so on. There is more information to transmit in subframes 4-5. Thus, the GPS system transmits a different page each time for subframes 4-5. There are a total of 25 pages so the whole cycle is 12.5 min (25*30=750 seconds).

In step 608, a lookup table is generated, with each bit designated as a risky bit or not. The table is downloaded to a lookup table in individual GNSS receivers. The table is periodically updated and downloaded to the GNSS receivers.

In one embodiment, multiple lookup tables are generated for different types of GNSS system. For example, two lookup tables are generated, one with data from GPS receivers and another with data from Beidou receivers.

Figure 7:
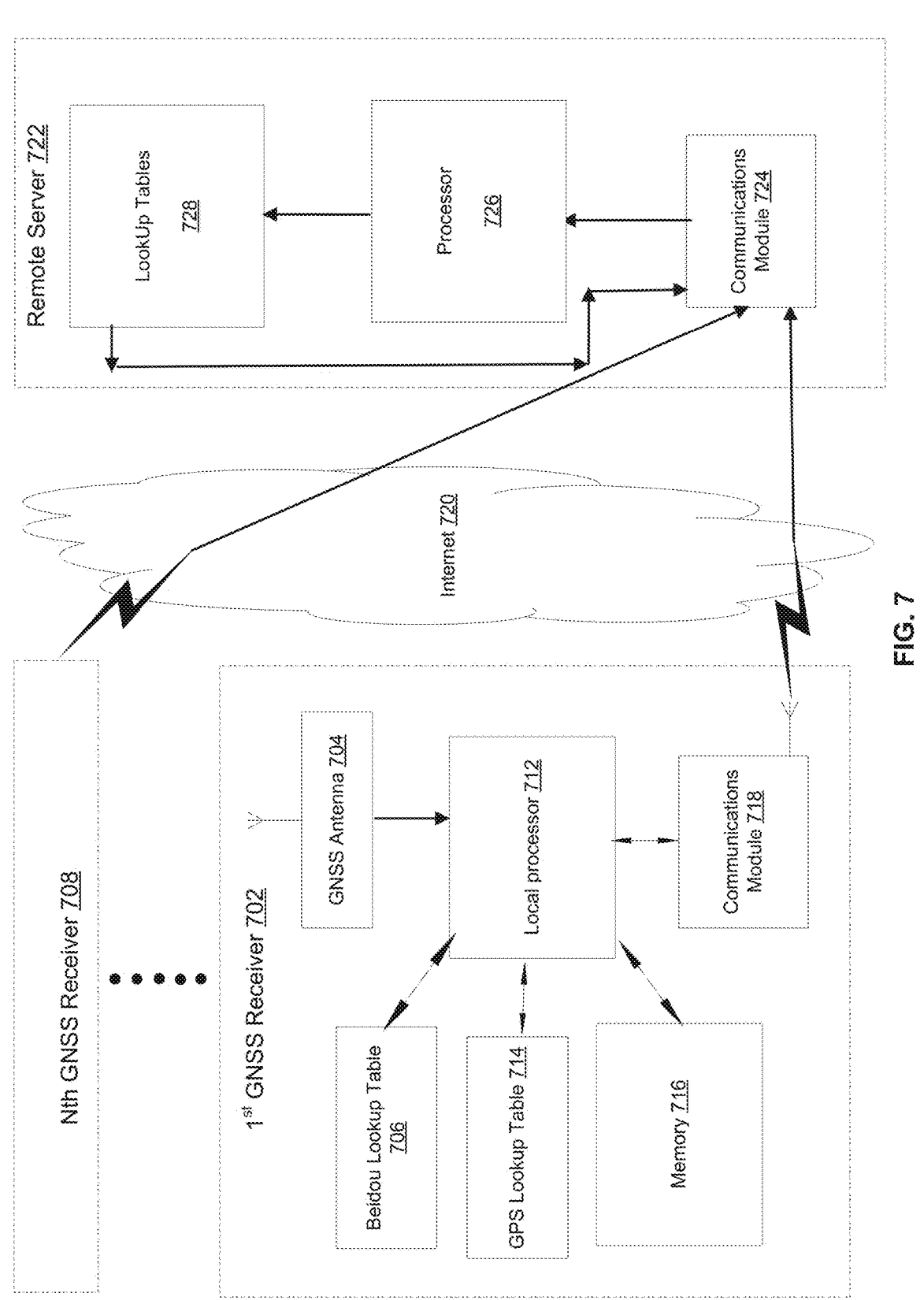
FIG. 7 is block diagram illustrating the preprocessing of the lookup table in the cloud and the downloading to GNSS receivers, according to embodiments.

FIG. 7 is block diagram illustrating the preprocessing of the lookup table in the cloud and the downloading to GNSS receivers, according to embodiments. In one embodiment, the GNSS receivers in the field have the capability of saving the navigation data bits received in real-time to log files that are stored in nonvolatile memory 716. A File Transfer Protocol (FTP) is used to periodically push the log files from the GNSS receivers that have internet connection to remote servers, such as once a day. Local processor 712 reads the log files from memory 716, and uses FTP to send them over Internet 720 and/or other networks with communications module 718. The are received by remote server 722 at its communications module 724. Processor(s) 726 then generates the lookup tables using these log files from multiple GNSS receivers 708. In one embodiment, pre-generated lookup tables are then embedded in new GNSS receiver firmware during manufacture. In an alternate embodiment, the pre-processing and generation of the lookup table is done in the GNSS receiver.

A GNSS receiver 702 has at least one GNSS antenna 704. A local processor 712 receives data from the antenna. Processor 712 uses memory 716, which can be several memories, for the programs and data. A GPS lookup table 714 is used to identify risky bits, as discussed above, for GPS signals. A Beidou lookup table 706 is used to identify risky bits, as discussed above, for Beidou signals. Alternately, a single lookup table is used.

In one potential embodiment, the lookup tables are then downloaded to GNSS Receivers 702-708 through communications module 724 and internet 720.

Figure 8:
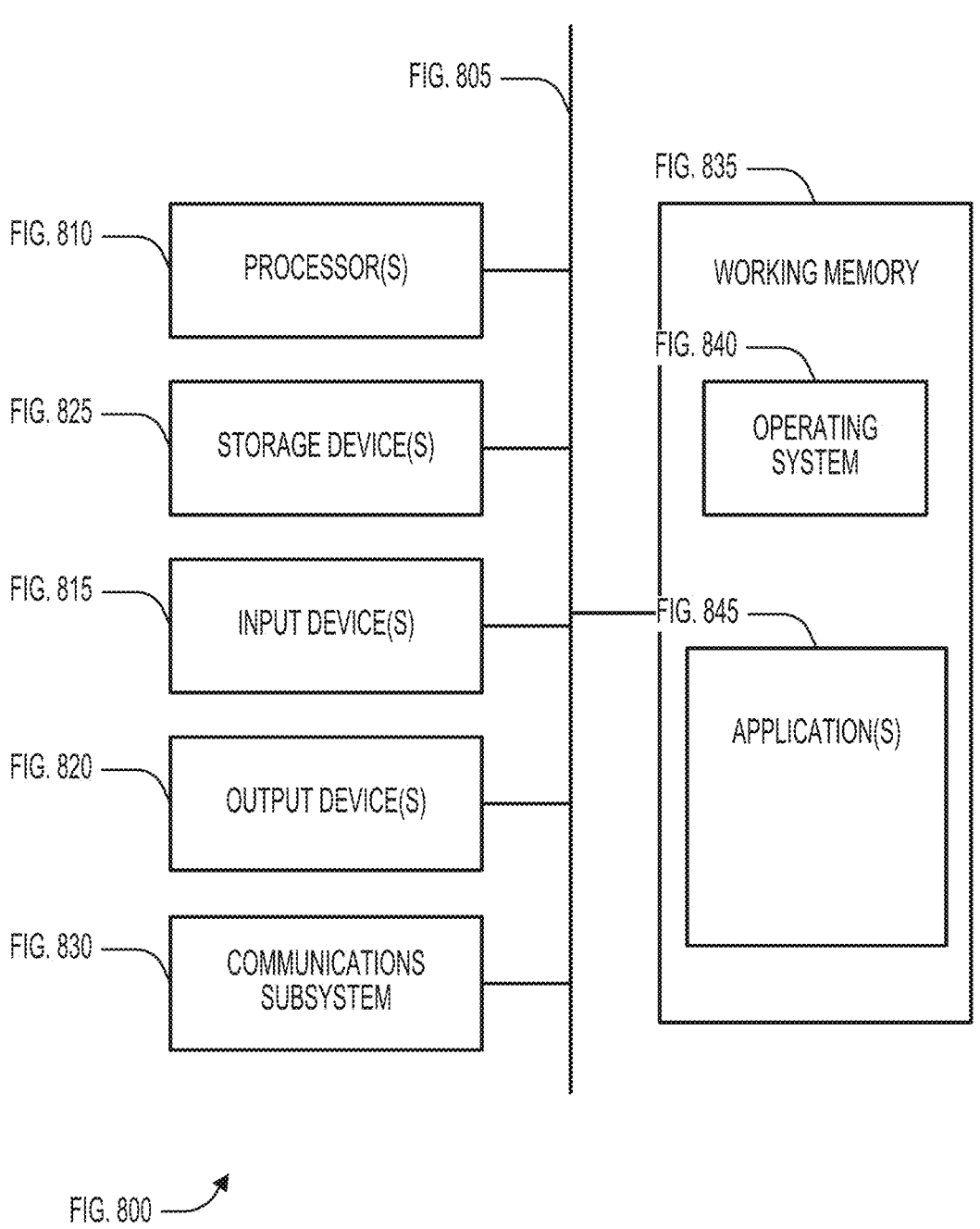
FIG. 8 illustrates a simplified computer system for performing the processes of embodiments, according to embodiments.

FIG. 8 illustrates a simplified computer system 800, in accordance with some embodiments of the present disclosure. FIG. 8 provides a schematic illustration of one embodiment of computer system 800 that can perform some or all of the steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or more integrated manner.

Computer system 800 is shown comprising hardware elements that can be electrically coupled via a bus 805, or may otherwise be in communication, as appropriate. The hardware elements may include one or more processors 810, including without limitation one or more general-purpose processors and/or one or more special-purpose processors such as digital signal processing chips, graphics acceleration processors, and/or the like; one or more input devices 815, which can include, without limitation a mouse, a keyboard, a camera, and/or the like; and one or more output devices 820, which can include, without limitation a display device, a printer, and/or the like.

Computer system 800 may further include and/or be in communication with one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 800 might also include a communications subsystem 830, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 830 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 830. In other embodiments, a portable electronic device, e.g., the first electronic device, may be incorporated into computer system 800, e.g., an electronic device as an input device 815. In some embodiments, computer system 800 will further comprise a working memory 835, which can include a RAM or ROM device, as described above.

Computer system 800 also can include software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general-purpose computer or other device to perform one or more operations in accordance with the described methods.

A set of these instructions and/or code may be stored on a non-transitory computer-readable storage medium, such as the storage device(s) 825 described above. In some cases, the storage medium might be incorporated within a computer system, such as computer system 800. In other embodiments, the storage medium might be separate from a computer system e.g., a removable medium, such as a compact disc, and/or provided in an installation package, such that the storage medium can be used to program, configure, and/or adapt a general-purpose computer with the instructions/code stored thereon. These instructions might take the form of executable code, which is executable by computer system 800 and/or might take the form of source and/or installable code, which, upon compilation and/or installation on computer system 800 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 800 to perform methods in accordance with various embodiments of the technology. According to a set of embodiments, some or all of the procedures of such methods are performed by computer system 800 in response to processor 810 executing one or more sequences of one or more instructions, which might be incorporated into the operating system 840 and/or other code, such as an application program 845, contained in the working memory 835. Such instructions may be read into the working memory 835 from another computer-readable medium, such as one or more of the storage device(s) 825. Merely by way of example, execution of the sequences of instructions contained in the working memory 835 might cause the processor(s) 810 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 800.

The communications subsystem 830 and/or components thereof generally will receive signals, and the bus 805 then might carry the signals and/or the data, instructions, etc. carried by the signals to the working memory 835, from which the processor(s) 810 retrieves and executes the instructions. The instructions received by the working memory 835 may optionally be stored on a non-transitory storage device 825 either before or after execution by the processor(s) 810.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method for reducing a risk of jamming during determination of polarity of navigation bits in a global navigation satellite system (GNSS) signal, comprising:
    receiving historic navigation data bits at a server from a plurality of GNSS receivers;
    eliminating historic navigation data bits when there are more than a threshold number of consecutive zeros or ones;
    determining risky bits by comparing bits of a subframe to corresponding bits of a different subframe and labeling bits that do not match as risky bits;
    preparing a lookup table of risky bits;
    providing the lookup table of risky bits to a GNSS receiver;
    loading the lookup table of risky bits into a memory in the GNSS receiver;
    receiving, at the GNSS receiver, current GNSS navigation data bits from a satellite;
    storing the current GNSS navigation data bits in a memory;
    flagging certain current GNSS navigation data bits as risky using the lookup table of risky bits;
    predicting new GNSS navigation data bits from the current GNSS navigation data bits stored in the memory;
    eliminating new GNSS navigation data bits when there are more than a threshold number of consecutive zeros or ones;
    comparing new GNSS navigation data bits to predicted new GNSS navigation data bits; and
    determining polarity based on a match of new GNSS navigation data bits to predicted new GNSS navigation data bits with no flagged risky bits.

2. The method of claim 1 wherein the threshold number of consecutive zeros or ones is between 21-65 bits.

3. The method of claim 1 wherein the lookup table of risky bits further comprises:
    a GPS lookup table for GPS satellites and receivers; and
    a Beidou lookup table for Beidou satellites and receivers.

4. The method of claim 1 wherein the threshold number of consecutive zeros or ones is between 21-35 bits.

5. The method of claim 1 further comprising:
    loading the lookup table of risky bits into a firmware memory in the GNSS receiver during manufacture of the GNSS receiver.

6. The method of claim 1 further comprising:
    downloading the lookup table of risky bits over an internet into the memory in the GNSS receiver.

7. The method of claim 1 wherein comparing bits of a subframe to corresponding bits of a different subframe comprises:
    comparing a sliding window of a group of bits to the same group of bits from the same position in another subframe.

8. The method of claim 1 wherein the GNSS receivers are attached to farm or construction equipment.

9. A method for reducing a risk of jamming during determination of polarity of navigation bits in a global navigation satellite system (GNSS) signal, comprising:
    receiving historic navigation data bits at a server from a plurality of GNSS receivers;
    eliminating historic navigation data bits when there are more than a threshold between 21-65 bits of consecutive zeros or ones;
    determining risky bits by comparing bits of a subframe to corresponding bits of a different subframe and labeling bits that do not match as risky bits;
    preparing two lookup tables of risky bits, a GPS lookup table for GPS satellites and receivers and a Beidou lookup table for Beidou satellites and receivers;
    loading the lookup tables of risky bits into a memory in a new GNSS receiver during manufacture of the GNSS receiver;
    receiving, at the new GNSS receiver, current GNSS navigation data bits from a satellite;
    storing the current GNSS navigation data bits in a memory;
    flagging certain current GNSS navigation data bits as risky using the lookup table of risky bits;
    predicting new GNSS navigation data bits from the current GNSS navigation data bits stored in the memory;
    eliminating new GNSS navigation data bits when there are more than a threshold between 21-65 bits of consecutive zeros or ones;
    comparing new GNSS navigation data bits to predicted new GNSS navigation data bits; and
    determining polarity based on a match of new GNSS navigation data bits to predicted new GNSS navigation data bits with no flagged risky bits.

10. The method of claim 9 further comprising:
    downloading an updated lookup table of risky bits over an internet into the memory in the new GNSS receiver.

11. The method of claim 9 wherein comparing bits of a subframe to corresponding bits of a different subframe comprises:
    comparing a sliding window of a group of bits to the same group of bits from the same position in another subframe.

12. The method of claim 9 wherein the GNSS receivers are attached to farm or construction equipment.

13. A system for reducing a risk of jamming during determination of polarity of navigation bits in a global navigation satellite system (GNSS) signal, comprising:
    a remote server including:
    a server processor; and
    a server memory at the remote server having a non-transitory computer readable medium storing instructions that, when executed by the server processor, causes the server processor to:
        receive historic navigation data bits at a server from a plurality of GNSS receivers;

eliminate historic navigation data bits when there are more than a threshold number of consecutive zeros or ones;

determine risky bits by comparing bits of a subframe to corresponding bits of a different subframe and labeling bits that do not match as risky bits;

prepare a lookup table of risky bits; and provide the lookup table of risky bits to a GNSS receiver;

the GNSS receiver including:

a GNSS processor, and a GNSS memory, having a non-transitory computer readable medium storing instructions that, when executed by the GNSS processor, causes the GNSS processor to:

load the lookup table of risky bits into a memory in the GNSS receiver;

receive, at the GNSS receiver, current GNSS navigation data bits from a satellite;

store the current GNSS navigation data bits in a memory;

flag certain current GNSS navigation data bits as risky using the lookup table of risky bits;

predict new GNSS navigation data bits from the current GNSS navigation data bits stored in the memory;

eliminate new GNSS navigation data bits when there are more than a threshold number of consecutive zeros or ones;

compare new GNSS navigation data bits to predicted new GNSS navigation data bits; and determine polarity based on a match of new GNSS navigation data bits to predicted new GNSS navigation data bits with no flagged risky bits.

14. The system of claim 13 wherein the threshold number of consecutive zeros or ones is between 21-65 bits.

15. The system of claim 13 wherein the lookup table of risky bits further comprises:

a GPS lookup table for GPS satellites and receivers; and a Beidou lookup table for Beidou satellites and receivers.

16. The system of claim 13 wherein the threshold number of consecutive zeros or ones is between 21-35 bits.

17. The system of claim 13 further comprising instructions that, when executed by the GNSS processor, causes the GNSS processor to:

load the lookup table of risky bits into a firmware memory in the GNSS receiver during manufacture of the GNSS receiver.

18. The system of claim 13 further comprising instructions that, when executed by the GNSS processor, causes the GNSS processor to:

download the lookup table of risky bits over an internet into the memory in the GNSS receiver.

19. The system of claim 13 wherein comparing bits of a subframe to corresponding bits of a different subframe comprises:

comparing a sliding window of a group of bits to the same group of bits from the same position in another subframe.

20. The system of claim 13 wherein the GNSS receivers are attached to farm or construction equipment.

* * * * *